United States Patent [19]
Viertel et al.

[11] Patent Number: 5,401,073
[45] Date of Patent: Mar. 28, 1995

[54] SUN VISOR FOR VEHICLES WITH MIRROR ATTACHMENT

[75] Inventors: Lothar Viertel, Altforweiler, Germany; Rene Lecorvaisier, Hombourg-Haut, France; Patrick Sauder, Folschviller, France; Christian Buchheit, Ham sus Vasberg, France

[73] Assignee: Gebr. Happich GmbH, Wuppertal, Germany

[21] Appl. No.: 117,234

[22] Filed: Sep. 7, 1993

[30] Foreign Application Priority Data

Sep. 9, 1992 [DE] Germany .................. 42 30 109.2

[51] Int. Cl.6 ............................................ B60J 3/02
[52] U.S. Cl. ................................ 296/97.1; 296/97.5
[58] Field of Search ................... 296/97.2, 97.5, 97.1

[56] References Cited

U.S. PATENT DOCUMENTS

| | | | |
|---|---|---|---|
| 3,843,236 | 10/1974 | Kurz, Jr. ............... | 296/97.5 X |
| 4,068,930 | 1/1978 | Marcus ................. | 296/97.5 X |
| 4,763,946 | 8/1988 | Robbins et al. . | |
| 4,984,137 | 1/1991 | Maemura ............. | 296/97.2 X |
| 4,997,228 | 3/1991 | Kempkers . | |
| 5,184,888 | 2/1993 | Sakuma et al. ...... | 296/97.2 X |
| 5,318,336 | 6/1994 | Aymerich et al. ... | 296/97.1 X |

FOREIGN PATENT DOCUMENTS

| | | | |
|---|---|---|---|
| 1831515 | 3/1961 | Germany . | |
| 8201176 | 1/1982 | Germany . | |
| 3900870 | 1/1989 | Germany . | |
| 4023243 | 11/1991 | Germany ............. | 296/97.2 |
| 9111340 | 8/1991 | WIPO ................... | 296/97.2 |

*Primary Examiner*—Joseph Pape
*Attorney, Agent, or Firm*—Ostrolenk, Faber, Gerb & Soffen

[57] ABSTRACT

A vehicle sun visor having a body comprised of polypropylene particle foam with a recess in its broad side for receiving a mirror supported in a frame. A series of openings arrayed in the visor body around the periphery of the recess. The frame being an integral plastic injection molding with anchoring pins defined on it at locations corresponding to the openings in the visor body, and the pins being installed in the openings for holding the mirror and frame to the recess. Each of the anchoring pins having a ring like elevation around it which engages in the opening in the visor body.

4 Claims, 1 Drawing Sheet

SUN VISOR FOR VEHICLES WITH MIRROR ATTACHMENT

BACKGROUND OF THE INVENTION

The present invention relates to a sun visor for vehicles having a foam material sun visor body, e.g. a body which consists of polypropylene particle foam, and which is provided in its broad side with a recess into which a mirror held by a frame is inserted.

Various systems are known for fastening a mirror to a sun visor body. Mirror frames are frequently welded to a cover which surrounds the sun visor body. But this limits the selection of the material of the frame and prevents its removal from the sun visor body. These disadvantages are present also in the case of traditional glued attachments. In other traditional systems of mirror attachment, the sun visor body is provided locally with inserts formed therein which have developments thereon for clamping, screwing or clipping to mounting elements which are arranged on the mirror frame. The disadvantage of this is the expense of manufacture and the fact that subsequent mirror removal is frequently difficult.

SUMMARY OF THE INVENTION

Accordingly, the object of the present invention is to develop a sun visor which holds a mirror but wherein molded or bonded or glue connections, as well as additional insert parts within the sun visor body, can be avoided. Furthermore, rational and thus cost favorable manufacture is to be obtained and it should be possible to remove the mirror without damage, in order to simplify recycling.

To achieve this object, the invention comprises distributing openings over the periphery of the mirror recess in the foam sun visor body in the region of its edge. The openings receive anchoring pins which are arranged on the frame. The frame together with the anchoring pins is developed as a one piece plastic molding. Each anchoring pin has at least one and preferably several ring shaped elevations or ribs, each forming an undercut so that the pin anchors itself in the foam body.

It has surprisingly been found that attachment of a mirror according to the invention can optimally satisfy release requirements specified by the customers, such as impact testing, and the like. This finding was not self evident but, rather, was very surprising, since early attempts with conventional foam material such as polyurethane, and the like, never produced the desired result, but instead failed already upon impact testing.

The invention includes the discovery that polypropylene particle foam is preferred because it behaves entirely differently than other foams previously used for the sun visor body when the mirror frame is to be anchored in the foam body.

Other features and advantages of the present invention will become apparent from the following description of the invention which refers to the accompanying drawings.

DETAILED DESCRIPTION OF THE PREFERRED EMBODIMENT

Figure 1:
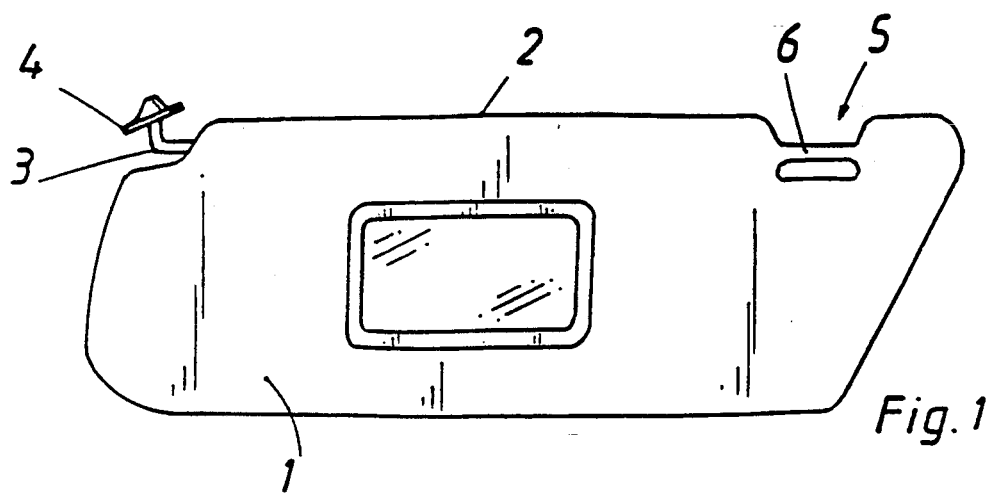
FIG. 1 shows a sun visor in its position of use.
Figure 2:
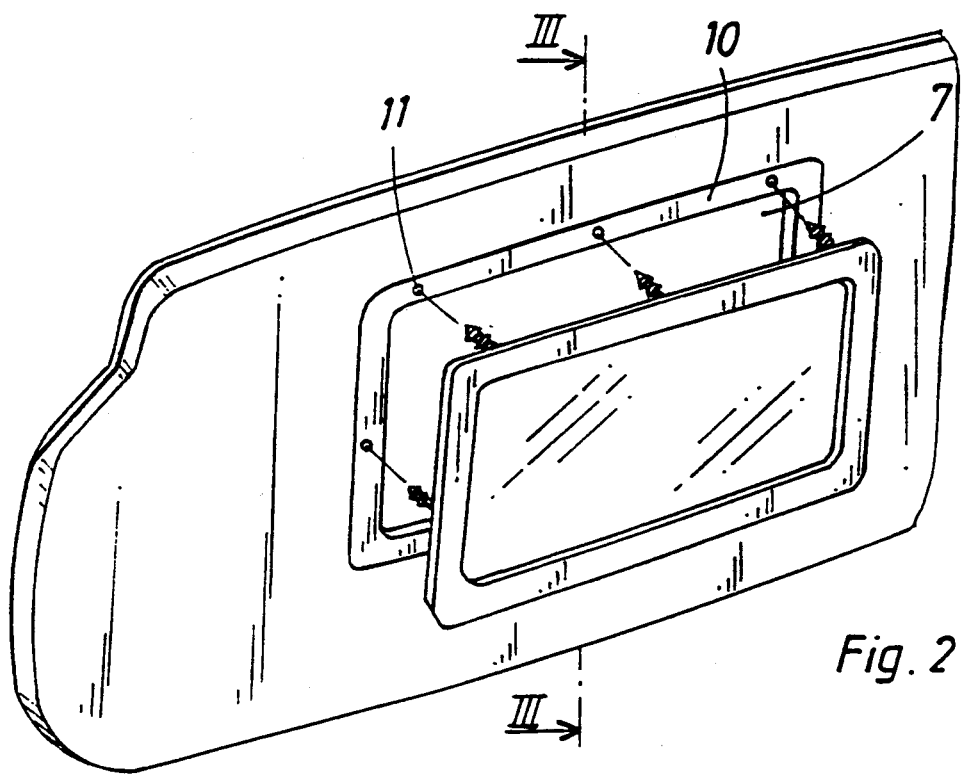
FIG. 2 is an exploded perspective view of the sun visor of FIG. 1.

The sun visor comprises a sun visor body 1 having an upper longitudinal edge 2 with a sun visor shaft 3 incorporated at the left side thereof in FIG. 1. The sun visor shaft 3 is mounted at its other outer end in a mounting bracket 4, which can be fastened to the body of a vehicle (not shown). On the right side of FIG. 1, the sun visor body 1 has an outer support pin 6 which passes through a recess 5 and can be detachably engaged in an outer support bracket (not shown) on the vehicle.

The sun visor body 1 is formed of polypropylene particle foam. This choice of material is significant for the invention. On one broad side, the body includes a recess 7 into which a mirror 9, supported by a peripheral frame 8, is inserted. Openings 11, distributed around the periphery of the recess, extend into the body material from the surrounding edge region 10 of the recess 7. The openings 11 are perpendicular to the main plane of the sun visor body 1. The openings 11 are preferably formed during the manufacture of the sun visor body 1.

The frame 8 comprises a plastic injection molding of recyclable plastic material. Integrally formed in one piece with it and of the same material, the frame has anchoring pins 12 developed on it corresponding to the gauge and distribution of the openings 11. The anchoring pins 12 have a plurality of peripheral elevations or ridges 13 of ring Shaped development which are profiled to form removal inhibiting undercuts opposite their direction of insertion. The diameter of the anchoring pins 12 is preferably larger in the region of the elevations 13 than the diameter of the openings 11 which receive the pins.

For the manufacture of a sun visor body 1, a mold is used having a mold cavity which is constricted in order to form the recess 7 and the openings 11. A charge of foam particles is introduced into the mold cavity and the mold is heated with steam so that the foam particles soften, expand, and weld together. After cooling, the sun visor body 1 can be removed from the mold.

Figures 3, 4, 5:
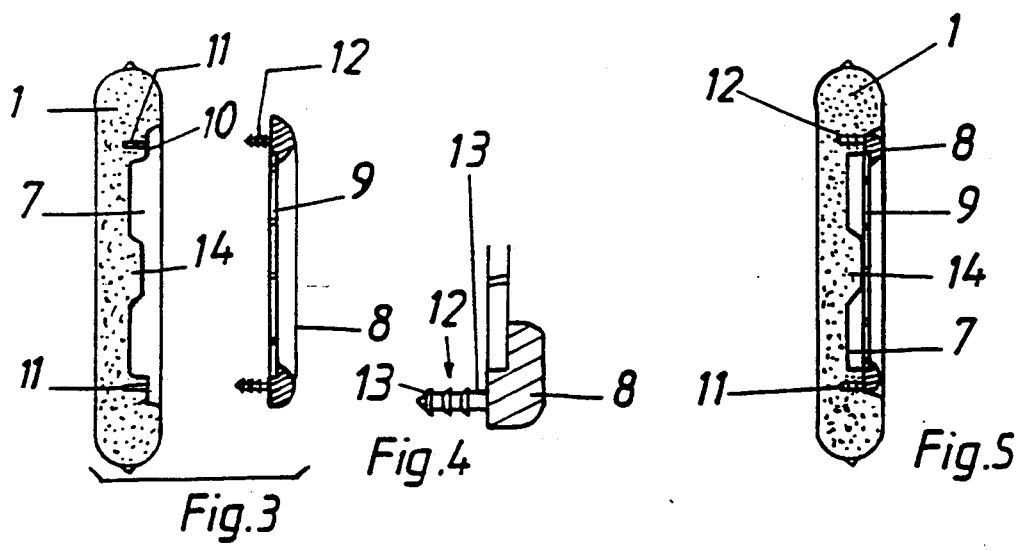
FIG. 3 is a section along the line III—III of FIG. 2.
FIG. 4 is an enlarged view of the region X in FIG. 3.
FIG. 5 is a section along the line III—III of FIG. 2, but with the parts assembled.

Prior to the insertion of the mirror in the recess, the sun visor body 1 may be provided with a cover foil, which may consist of polypropylene. The unit consisting of the mirror 9 and the frame 8 is then inserted into the recess 7 such that the anchoring pins 12 are merely pressed into the corresponding openings 11, which consist in practice of blind holes. As further shown in the FIGS. 3 and 5, the mirror 9 is supported on its periphery, but is elsewhere supported only spotwise by local elevations 14 in the recess 7.

Although the present invention has been described in relation to a particular embodiment thereof, many other variations and modifications and other uses will become apparent to those skilled in the art. It is preferred, therefore, that the present invention be limited not by the specific disclosure herein, but only by the appended claims.

What is claimed is:

1. A sun visor for a vehicle, the sun visor comprising a sun visor body formed from polypropylene particle foam;

the visor body having a broad side and being shaped to define a mirror receiving recess in the broad side, the recess being surrounded and defined by a periphery in the visor body broad side; and a plurality of mirror frame anchoring pin receiving openings defined in the periphery of the recess and extending into the visor body for directly receiving anchoring pins on a mirror.

2. A sun visor for a vehicle, the sun visor comprising:
a sun visor body formed from polypropylene particle foam; the visor body having a broad side and being shaped to define a mirror receiving recess in the broad side, the recess being surrounded and defined by a periphery in the visor body broad side;
a plurality of mirror frame anchoring pin receiving openings defined in the periphery of the recess and extending into the visor body for directly receiving anchoring pins;
a mirror for being installed in the recess; a frame around the mirror supporting the mirror;
a plurality of anchoring pins defined on the frame at positions corresponding to the openings in the periphery of the recess of the visor body, the anchoring pins being installable in the openings in the visor body and being shaped for the anchor pins to be held in the openings.

3. The sun visor of claim 2, wherein each anchoring pin has a ring like elevation defined thereon of a diameter larger than that of the respective opening for the pin and the ring like elevation being shaped to anchor itself in the foam material of the visor body surrounding the respective openings.

4. The sun visor of claim 2, wherein the mirror frame is developed integrally together with the anchoring pins thereof as a single piece plastic injection molding.

* * * * *